United States Patent [19]

Rode

[11] 4,298,887
[45] Nov. 3, 1981

[54] NON-UNIFORMITY CORRECTION IN A MULTIELEMENT DETECTOR ARRAY

[75] Inventor: Jonathan P. Rode, Thousand Oaks, Calif.

[73] Assignee: Rockwell International Corporation, El Segundo, Calif.

[21] Appl. No.: 157,588

[22] Filed: Jun. 9, 1980

[51] Int. Cl.$^3$ .............................................. H04N 7/18
[52] U.S. Cl. .................................. 358/113; 358/163; 358/213; 364/515; 364/517
[58] Field of Search ............... 358/113, 163, 213, 109; 364/515, 517

[56] References Cited

U.S. PATENT DOCUMENTS

| | | |
|---|---|---|
| 2,951,175 | 8/1960 | Null . |
| 3,017,458 | 1/1962 | Garbuny . |
| 3,067,283 | 12/1962 | Petritz . |
| 3,599,209 | 8/1971 | Goodrich ............................ 364/517 |
| 3,787,668 | 1/1974 | Currie ................................. 364/517 |
| 3,800,079 | 3/1974 | McNeil . |
| 3,830,972 | 8/1974 | McHugh . |
| 3,925,650 | 12/1975 | Brown ................................. 364/517 |

OTHER PUBLICATIONS

IEEE Transactions on Electron Devices vol. ED-25, No. 2 pp. 213-232, Feb. 1978, Longo et al. "Infrared Focal Planes . . . ".

Primary Examiner—Howard Britton
Attorney, Agent, or Firm—H. Fredrick Hamann; Craig O. Malin; John J. Deinken

[57] ABSTRACT

Disclosed is a multielement staring infrared imaging system, including a focal plane array of detectors for responding to a scene, a CCD multiplexer for serializing the outputs of the detectors, a CCD driver for controlling the multiplexer, an analog to digital converter for digitizing the serialized outputs, a recursive filter for weighting the digitized outputs and combining the weighted outputs with previous weighted outputs to produce a correction output, an arithmetic unit for subtracting the correction output from the digitized output to compensate for the non-uniformity of each detector, a waveform generator for synchronizing the operation of the CCD driver, the analog to digital converter, and the offset correction unit, and an imager display for receiving the compensated output and displaying a corrected image of the scene. Non-uniformities in the elements of an infrared staring detector array are corrected by the steps of recording the outputs of the array at each readout time, element by element, combining the outputs recorded during a selected time interval, element by element, in a convolution integral to produce an averaged background response for each element, and subtracting the averaged response for each element from the most recent response for that element to correct for the non-uniformity of that element.

11 Claims, 5 Drawing Figures

NON-UNIFORMITY CORRECTION IN A MULTIELEMENT DETECTOR ARRAY

BACKGROUND OF THE INVENTION

This invention relates to multielement electro-optic imaging systems and, more particularly, to techniques for compensating such systems for the non-uniformities introduced by the individual detector elements.

In a scanned imaging system, an image sensitive detector element is scanned across a scene and the response of the element is read out and utilized to reconstitute an image of the scene. A pure scanned system, however, is inherently limited in its ultimate performance, a characteristic which prompted the development of improving imaging techniques, such as the two dimensional focal plane array.

In the two dimensional focal plane, the desired scene is optically focused on a matrix of multiple detector elements so that each element images a particular portion of the scene. Such focal planes exhibit significant advantages in a number of important applications, such as in the field of infrared imaging. In this area, the employment of infrared focal planes has become particularly desirable as a result of the development of improved signal processing techniques which allow the detectors to be integrated with the necessary electronic signal conditioning for the focal plane. By interfacing detectors with signal processing electronics in a high density configuration using photolithographic processes, a potentially low cost focal plane can be achieved. The integrated focal plane can also exhibit enhanced performance as a result of the larger number of detectors which may be included in a focal plane of a given size.

These integrated techniques have made feasible high density non-scanned, or staring, infrared systems. Non-scanned thermal imagers are advantageous in many applications because of their characteristic low weight, simple optics, immunity to shock, and potentially low cost. In addition, a staring system is inherently more sensitive than a scanned system because of the longer integration times which are achievable with staring sensors.

Although multielement sensing systems are thus potentially a very advantageous approach to imaging, the multielement nature of such systems introduces a limitation on system performance, due to the lack of uniformity among the individual elements. This restriction is particularly important in the infrared region, where the inherently poor radiation contrast in that portion of the spectrum imposes severe demands on element-to-element signal uniformity. Thus, the responsivity and DC offset variations in a typical infrared detector array give rise to fixed pattern noise of a magnitude which can readily mask low contrast thermal images.

In the past, offset non-uniformities, which result from variations among the detector elements of an array in leakage current, bias, and responsivity to the background, have ordinarily been corrected by means of a uniform temperature reference. A correction signal is obtained in this technique by recording the individual response of each detector element to the infrared radiation which emanates from the uniform temperature reference. The correction is accomplished on the input unit cell by subtraction off the focal plane in a signal processing area where either analog or digital scaling may be applied. In a staring focal plane, however, it is often inconvenient to provide such a temperature reference. In addition, such references, and their accompanying shuttering systems, add additional cost and complications to an imaging system. Such temperature references may also require calibration before an imaging system can be rendered operational. If it is also necessary to correct for AC or gain non-uniformities, a second temperature reference at a different temperature must also be provided to accomplish the gain correction, which further increases the complexity of the system. The off focal plane signal processing then performs the correction in the input unit cell both by subtraction and by variable gain input circuits, utilizing the individual responses of the detectors to each of the uniform temperature scenes.

Therefore, a need has developed in the art for an improved technique to compensate for non-uniformities in a multielement detector array.

SUMMARY OF THE INVENTION

It is a general object of this invention to provide a new and improved technique to correct for the non-uniformities in the elements of a detector array which is focused on a changing scene.

In order to correct for such non-uniformities, the invention includes the steps of:

(a) recording the output from each detector element at a plurality of times, (b) weighting the recorded outputs, (c) summing the weighted outputs for each detector element, and (d) subtracting the summed output for each element from the present output of that element to provide a corrected output.

In a more particular embodiment, the weighting and summing operations may involve applying a convolution integral to the recorded outputs. In an additional refinement of the invention, the step of recording the output of each detector element further including initially recording the output from each element at a number of times during a relatively brief time interval to provide an initial non-uniformity correction. The outputs are subsequently recorded from each element at a greater number of times during a longer time interval to enhance the accuracy of the subsequent corrected output.

As applied to an infrared staring detector array, the method corrects for non-uniformities in the elements of the array by the steps of:

(a) recording the outputs from the array at each readout time, element by element, (b) combining the outputs recorded during a selected time interval, element by element, in a convolution integral to produce an averaged response for each element, and (c) subtracting the averaged response for each element from the most recent response for that element to provide a corrected output.

In a signal compensation apparatus for a multielement staring imaging system of the type including a focal plane array of detectors, the invention includes a multiplexer for serializing the outputs of the detectors, a filter for weighting the serialized outputs and combining the weighted outputs with previous weighted outputs to produce correction outputs, and an arithmetic unit for subtracting the correction outputs from the serialized outputs to compensate for the element-to-element offset non-uniformity in the array. The apparatus may be used in conjuction with one temperature reference to correct for responsivity variations as well as offsets, with the arithmethic unit providing a multiplication to correct for gain variations following the subtraction of the correction output from the serialized output.

A multielement staring infrared imaging system which incorporates the present invention includes a focal plane array of detectors for responding to a scene. A CCD multiplexer is provided for serializing the outputs of the detectors, while a CCD driver is utilized to control the multiplexer. An analog to digital converter digitizes the serialized outputs, the digitized outputs then being weighted by a recursive filter, which also combines the weighted outputs with previous weighted outputs to produce a correction output. An arithmetic unit subtracts the correction output from the digitized output to compensate for the non-uniformity of each detector, while a waveform generator is provided to synchronize the operation of the CCD driver, the analog to digital converter, and the offset correction unit. Finally, an imager display receives the compensated output and displays a corrected image of the scene.

These examples, which summarize some of the more important features of the invention, have been broadly outlined in this section so that the contributions which this invention provides to the art may be better appreciated. There are, of course, additional aspects of the invention, which will be further described below and which are included within the subject matter of the appended claims.

BRIEF DESCRIPTION OF THE DRAWINGS

Additional objects, features, and advantages of the present invention will become apparent by reference to the detailed description of the preferred embodiments in conjunction with the accompanying drawings, wherein the same reference numerals refer to like elements throughout all the figures.

In the drawings:

FIG. 2 depicts an uncompensated image, FIG. 3 depicts compensation by prior art techniques, and FIG. 4 depicts the compensation achieved with the technique of the present invention.

DESCRIPTION OF THE PREFERRED EMBODIMENTS

This invention is concerned with the problem of correcting for non-uniformities among the elements of a multiple detector array in order to accurately display the scene information received by the array. Although, as will be appreciated by those skilled in the art, the applicability of the invention is not limited to the infrared region of the spectrum, the preferred embodiments have been developed in connection with infrared imaging systems. Consequently, the discussion here will focus on the application of the invention to correcting for non-uniformities in infrared imaging systems.

Figure 1:
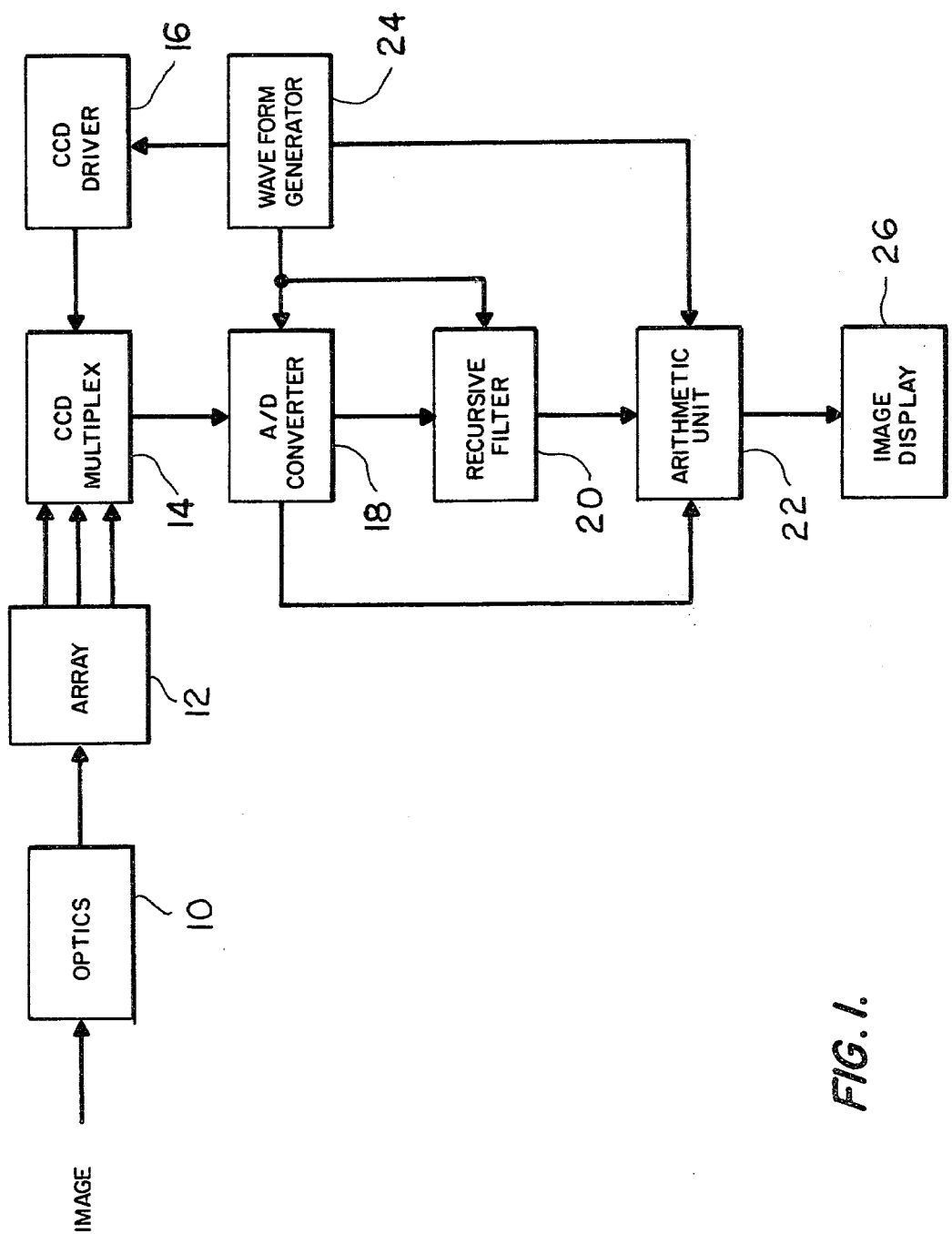
FIG. 1 is a schematic block diagram of a multielement staring infrared imaging system incorporating the compensation technique of the present invention.

FIG. 1 provides a schematic block diagram of a multielement staring infrared imaging system, including the non-uniformity correction technique of the present invention. Appropriate optical devices 10, which may be selected by those skilled in the art, are utilized to focus an image on a multielement focal plane array 12, which is a two dimensional matrix of infrared sensitive detectors, typically photovoltaic cells.

The responses of the detectors in the matrix are supplied to a CCD multiplexer 14, which serializes the detector outputs for further processing. A CCD driver 16 controls the multiplexer 14 by selecting storage and readout times for the multiplexer. The serialized output of the multiplexer is digitized in an analog to digital converter 18, the digital information then being applied to a recursive filter 20. The filter 20 weights the digitized outputs and combines the weighted outputs with previous weighted outputs to produce a correction output.

An arithmetic unit 22 subtracts the correction output from the digitized output of the analog to digital converter 18, thereby compensating for the offset non-uniformity of each detector element. A waveform generator 24 provides clocking signals to synchronize the operation of the driver 16, the converter 18, and the arithmetic unit 22. The corrected outputs are then applied to an image display 26 to display a corrected image of the scene.

Infrared thermal imaging, which utilizes the radiation emitted from the viewed scene, is generally more difficult to accomplish than is visible imaging, which operates with light reflected from the scene, because the scene generally exhibits a lower contrast with respect to background radiation in the infrared imaging scheme and further because available infrared detectors are not as uniform in performance as are those detectors which are responsive in the visible light region. In order to correct for these non-uniformities, it is common practice to include in an infrared imaging system a uniform temperature reference to correct for offset non-uniformities. AC or gain non-uniformities may also be corrected if a second temperature reference, at a different temperature, is included. In a staring focal plane, however, it is often very inconvenient to provide one or more temperature references. The present invention eliminates the need for one temperature reference by providing a technique for synthesizing the temperature reference which would otherwise be required to correct for offset non-unifomities.

The synthesized temperature reference of the invention is created by a temporal integration, on a cell-by-cell basis, of the scene information incident on the detector array. During the integration time, a viewer focussed on a changing scene will have each cell exposed to a variety of radiating sources from locations spaced over the scene. If the proper period of integration is chosen, this exposure to multiple sources will approximate the average effective temperature of the scene. Any offset non-uniformity in the detector, from leakage currents or non-uniformites in the response of the DC component of flux, will also be in the output and included in the average. Thus, when this information is applied as a correction to the focal plane signal, the offset non-uniformities will be removed.

In mathematical terms, this method can be analyzed as follows. For the nth detector we have:

$$I_n(x,t) = I_{nl} + R_n[P_{nDC}(x,t) + P_{nAC}(x,t)] \tag{1}$$

where:

x = spatial position of that portion of the scene which is imaged by the nth detector,
t = time,
$I_{nl}$ = leakage current of the nth detector,
$R_n$ = responsivity (amps/watt) of the nth detector,
$P_{nDC}(x,t)$ = incident DC (offset) component of power, and
$P_{nAC}(x,t)$ = incident AC (gain) component of power.

The term $P_n(x,t)$ indicates that the power incident on the nth detector depends both on the time t as well as the direction x in which the focal plane is pointed. $P_{nDC}(x,t)$ may vary slowly, as when the day cools during the evening. In many applications the viewed scene will be dynamic, i.e., either the direction in which the imager is pointed will be changing or the scene itself will be moving. If an average is taken over a time interval in which the scene changes many times, say 10 minutes, then the average current will be:

$$\int_{-10}^{0}\frac{I_n dt}{T} = \int \frac{I_{nl} dt}{T} + \frac{R_n}{T}[\int P_{nDC}(x,t)dt + \int P_{nAC}(x,t)dt]$$

$$= I_{nl} + \frac{R_n}{T}[\int P_{nDC}(x,t)dt + \int P_{nAC}(x,t)dt] \quad (2)$$

The integral in Equation (2) is a mathematical example of the function which a recursive filter can accomplish, i.e., apply equal weights to inputs over a 10 minute period, with previous inputs disregarded. The value of the two integrals on the right side of Equation (2) depends implicity on n as well as explicitly on t and x. If the focal plane is fixed in position with respect to the scene, there will be no dependence on x and the expression becomes:

$$\int_{-10}^{0}\frac{I_n dt}{T} = I_{nl} + R_n[(\overline{P_{nDC}(x)} + \overline{P_{nAC}(x)})] \quad (3)$$

when this quantity is subtracted from the current input to the nth detector, $I_n(t_o,x)$, the result is:

$$I_n(t_o,x) = R_n[P_{nAC}(x,t) - \overline{P_{nAC}(x)}] \quad (4)$$

This correction when applied to the detector array will cancel the signal unless $P_n(t)$ changes with time over periods longer than the integration time. The effect is to provide a differential detector with a slkw response.

If one assumes instead that x is changing rapidly enough in 5 to 10 minutes so that taking a time average is equivalent to taking a spatial average of the incident radiation, the benefit of a synthesized temperature reference is obtained. Equation 3 becomes:

$$\int_{-10}^{0}\frac{I_n dt}{T} = I_{nl} + R_n[\overline{P_{DC}}] = I_{nc} \quad (5)$$

In Equation (5), $\overline{P_{DC}}$ which varies slowly with time, now includes a spatial as well as time average. $\overline{P_{AC}}$ will be near zero since it fluctuates in both time and space and is integrated over both. Now applying this correction to off focal plane signal processing yields:

$$I_n(x,t) = I_n(x,t) - I_{nc} = R_n[P_{nDC}(x,t) - \overline{P_{DC}} + P_{nAC}(x,t)] \quad (6)$$

where $I_n(x,t)$ is the offset corrected output of the nth detector. The result is that only differences from the average scene background will be viewed. In this manner, leakage current and DC responsivity variations are corrected on a cell-by-cell basis. If injection efficiency, $\eta$, into a CCD must also be accounted for, the current into the CCD can be characterized as:

$$(I_{in})_n = (I_{DC})_n + \eta(I_{AC})_n \quad (7)$$

Since this expression will pass through the calculation in the same manner, the result will be the same.

Thus, in applying the present invention to correcting for non-uniformities in the elements of a detector array, the output from each detector element is recorded at a plurality of times during a time interval prior to the present output. The recorded outputs are weighted and the weighted outputs summed for each detector element. Finally, the summed output for each element is subtracted from the present output of that element to correct for the non-uniformities of that element.

Figure 2:
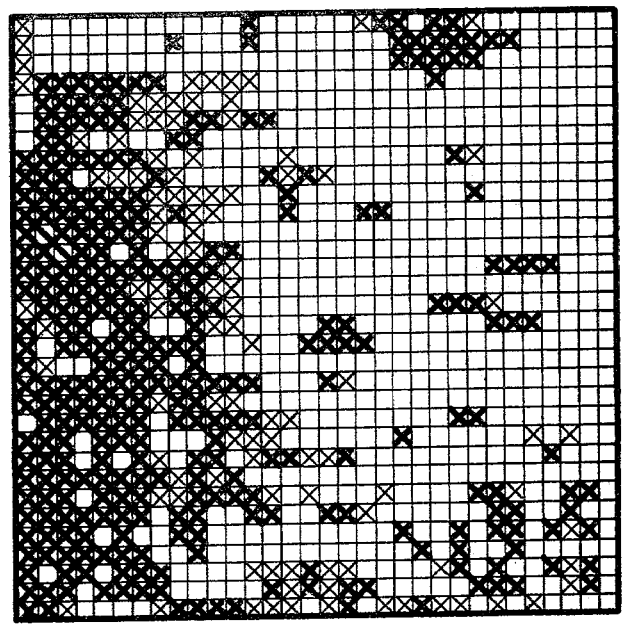
FIGS. 2, 3, and 4 depict representations of actual oscilloscope images which were obtained with a design focussed on a 32 $\times$ = element infrared focal plane, the design itself being illustrated in FIG. 5.
Figure 3:
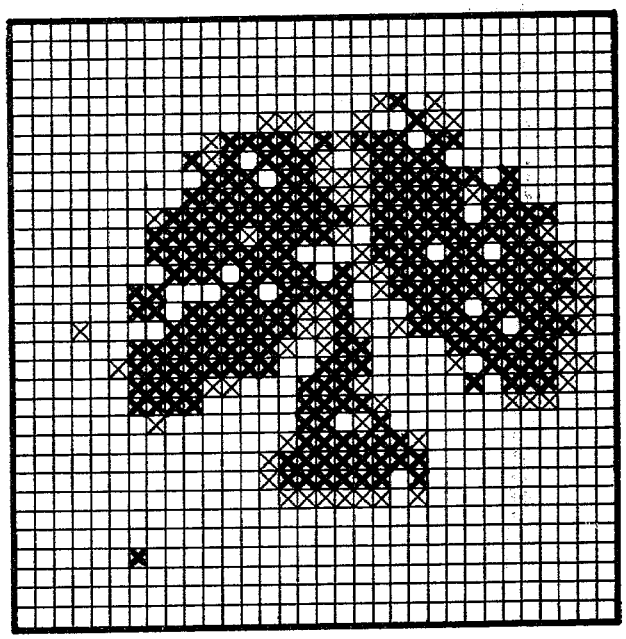
Figure 4:
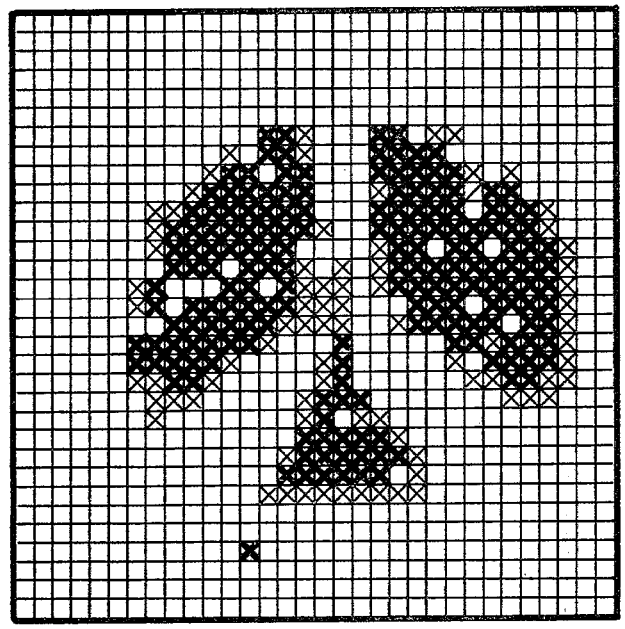
Figure 5:
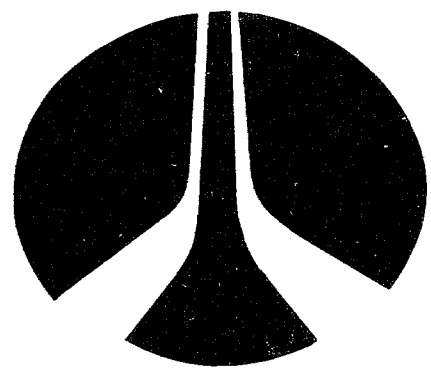

FIGS. 2, 3, and 4 are representations of actual images obtained on an oscilloscope screen connected to receive the output of a 32×32 element infrared focal plane focussed on the design illustrated in FIG. 5. FIG. 2 depicts the image which was obtained without correcting for any non-uniformities among the 1,024 detectors in the array. Virtually no signal information is discernible. FIG. 3 depicts the image displayed after compensation was applied for offset non-uniformities by prior art techniques utilizing a fixed temperature reference. Finally, the image illustrated in FIG. 4 was obtained by correcting for offset non-uniformities using the technique of the present invention. A comparison of FIGS. 3 and 4 will indicate the utility of the synthesized temperature reference of the present invention as a replacement for the temperature reference of the prior art.

The correction method of this invention is particularly advantageous because no additional mechanical components are necessary to accomplish the compensation, only one additional processing chip being required in the off focal plane signal processing area. Furthermore, the speed of operation of the imaging system is not reduced, while the synthesized temperature source will be at the ideal temperature, i.e., a temperature very near the average background temperature of the scene being viewed.

The present invention may also be used where an additional correction is required for AC or gain non-uniformities. The gain non-uniformity of a multielement focal plane will be proportional to the scene contrast and to the non-uniformity in response of the detectors, the latter typically ranging between ±5-10%. As a consequence, low contrast scenes will exhibit a low non-uniformity, which is desirable, since the low contrast situation is where imaging is most difficult to accomplish. If it is necessary, however, in a particular situation to compensate for the gain non-uniformity, a single temperature reference can be used in conjunction with the present invention. Alternatively, the gain non-uniformities may be preprogrammed during an initial calibration, since responsivity variations will not change significantly over time. In either case, referring again to Equation 6, the responsivity (gain) $R_n$ of each detector would be linearly corrected by a division of $I_n(x,t)$ by $I'_n(x,t) - I_{nc}$, where the prime indicates the response of the nth detector to the fixed temperature reference.

When using the compensation technique of the present invention, it is important to employ proper start up procedures and to consider unusual viewing situations. Where the period of integration is relatively long, for example 5–10 minutes, the correction provided by this technique will be minimal during the initial moments of viewing. This situation could also obtain after the viewed scene has changed abruptly, so that the average background radiation changes significantly. These problems, however, can be readily minimized by providing a reset capability on the integration process. For start up, a lens cap over the detector array could be utilized to act as a reference scene which would be loaded into the correction circuitry immediately after a reset. In addition, a special initial short integration time can be provided, perhaps on the order of 10 seconds. If the focal plane was rapidly scanned over the scene during this initial period, a fast approximate compensation would result.

This invention is generally intended to be applied in situations where the viewed scene is moving relative to the focal plane. If the scene remains stationary in the field of view of a period of time approaching the integration time, the scene will appear to fade because of the compensation technique as shown in Equation 4. This characteristic will not present a problem where the scene is changing or where the imager is moved relative to the scene.

In conclusion, although typical embodiments of the present invention have been illustrated and discussed above, numerous modifications and alternative embodiments of the apparatus and method of this invention will be apparent to those skilled in the art in view of this description. Accordingly, this description is to be considered as illustrative only and is provided for the purpose of teaching those skilled in the art the manner of constructing the apparatus and performing the method of this invention. Furthermore, it should be understood that the forms of the invention depicted and described herein are to be considered as the presently preferred embodiments. Various changes may be made in the configurations, sizes, and arrangements of the components of the invention, as will be recognized by those skilled in the art, without departing from the scope of the invention. Equivalent elements, for example, might be substituted for those illustrated and described herein, parts or connections might be reversed or otherwise interchanged, and certain features of the invention might be utilized independently of the use of other features, all as will be apparent to one skilled in the art after receiving the benefit attained through reading the above description of the invention.

What is claimed is:

1. A method of correcting for non-uniformities in an element of a detector array, comprising the steps of:
    (a) recording the output from the detector element at a plurality of times;
    (b) weighting the recorded outputs;
    (c) summing the weighted outputs for the detector element; and
    (d) subtracting the summed output for the element from the present output of that element to provide a corrected output.

2. The method of claim 1, wherein steps (b) and (c) of weighting and summing further comprise applying a convolution integral to the recorded outputs.

3. The method of claim 1, wherein step (a) of recording the output from the detector element further comprises initially recording the output from the detector element at a plurality of times during a relatively brief time interval to provide an initial non-uniformity correction and subsequently recording the output from the element at a plurality of times during a longer time interval to enhance the accuracy of the subsequent corrected output.

4. A method of correcting for non-uniformities in the elements of an infrared staring detector array, comprising the steps of:
    (a) recording the output from the array at each readout time, element by element;
    (b) combining the outputs recorded during a selected time interval, element by element, in a convolution integral to produce an averaged background response for each element; and
    (c) subtracting the averaged response for each element from the most recent response for that element to provide a corrected output.

5. A method of imaging a scene, comprising the steps of:
    (a) sensing the scene with a focal plane array of detectors;
    (b) serializing the outputs of the detectors at each readout time;
    (c) recording the output from each detector element at a plurality of times during a time interval;
    (d) weighting the recorded outputs,
    (e) summing the weighted outputs for each detector element;
    (f) subtracting the summed output for each element from the present output of that element to provide a corrected output; and
    (g) using the corrected outputs to display an image of the scene.

6. An apparatus for correcting for non-uniformities in a detector element of a multielement focal plane imaging system, comprising:
    means for recording the output from said detector element at a plurality of times;
    means for weighting said recorded outputs;
    means for summing said weighted outputs for said detector element; and
    means for subtracting said summed output for said element from the present output of that element to provide a corrected output.

7. A signal compensation apparatus for a multielement, staring imaging system of the type including a focal plane array of a plurality of detectors, comprising:
    a multiplexer for serializing the outputs from said detector at each readout time;
    a filter for weighting said serialized output for each detector and combining said weighted output for each detector with previous weighted outputs for that detector to produce element by element correction outputs; and
    an arithmetic unit for subtracting said correction output for each detector from said serialized output for that detector to compensate for the element-to-element offset non-uniformity in said array.

8. The apparatus of claim 7, further comprising an anlaog to digital converter for digitizing the outputs of said multiplexer, said filter further comprising a digital recursive filter.

9. The apparatus of claim 7, wherein said filter provides an initial relatively rapid correction output and a subsequent correction output which combines said previous weighted outputs over a longer time interval.

10. The apparatus of claim 9, further comprising a reset control to return said filter to said relatively rapid correction output.

11. A multielement staring infrared imaging system, comprising:
- a focal plane array of detectors for responding to a scene;
- a CCD multiplexer for serializing the outputs of said detectors;
- a CCD driver for controlling said multiplexer;
- an analog to digital converter for digitizing said serialized outputs;
- a recursive filter for weighting said digitized outputs and combining said weighted outputs with previous weighted outputs to produce a correction output;
- an arithmetic unit for subtracting said correction output from said digitized output to compensate for the non-uniformity of each detector;
- a waveform generator for synchronizing the operation of said CCD driver, said analog to digital converter, and said offset correction unit; and
- an imager display for receiving said compensated output and displaying a corrected image of said scene.

* * * * *